United States Patent [19]

Rieke

[11] Patent Number: 5,463,018
[45] Date of Patent: Oct. 31, 1995

[54] PREPARATION OF DOPED POLYCARBYNES

[75] Inventor: Reuben D. Rieke, Lincoln, Nebr.

[73] Assignee: Board of Regents of the University of Nebraska, Lincoln, Nebr.

[21] Appl. No.: 186,289

[22] Filed: Jan. 25, 1994

Related U.S. Application Data

[63] Continuation-in-part of Ser. No. 152,725, Nov. 15, 1993.

[51] Int. Cl.$^6$ ................................................. C08G 75/02
[52] U.S. Cl. .................. 528/373; 528/394; 528/395; 528/397; 528/398; 528/401; 528/403
[58] Field of Search ......................... 528/397, 373, 528/394, 395, 398, 401, 403

[56] References Cited

U.S. PATENT DOCUMENTS 5,211,886  5/1993  Rieke .
5,211,889  5/1993  Rieke .

OTHER PUBLICATIONS

P. A. Bianconi et al., "Poly(n–hexylsilyne): Synthesis and Properties of the first Alkyl Silicon [RSI]$_n$ Network Polymer", *J. Am. Chem. Soc.*, 110, 2342 (1988).
P. A. Bianconi et al., "Ultrasound–Mediated Reductive Condensation synthesis of Silicon–Silicon Bonded Network Polymers", *Macromolecules*, 22, 1697 (1989).
T.–C. Wu et al., "Organocalcium chemistry: Preparation and reactions of Highly Reactive Calcium", *J. Org. Chem.*, 55, 5045 (1990).
G. W. Ebert et al., "Direct Formation of Organocopper Compounds by Oxidative Addition of Zerovalent Copper to Organic Halides", *J. Org. Chem.*, 49, 5280 (1984).
K. Furukawa et al., "Optical Properties of Silicon Network Polymers", *Macromolecules*, 23, 3423 (1990).
S.–i. Inaba et al., "Highly Reactive Metallic Nickel: Reductive Homocoupling Reagent for Benzylic Mono– and Polyhalides", *J. Org. Chem.*, 49, 2093 (1984).
K. J. Klabunde et al., "Active Metal Slurries by Metal Vapor Techniques. Reactions with Alkyl and Aryl Halides", *J. Org. Chem.*, 44, 3901 (1979).
R. A. O'Brien et al., "Functionalization of Halogenated Polystyrene Resins utilizing Highly Reactive Calcium", *J. of Inorganic and Organometallic Polymers*, 2, 345 (1992).
M. A. Plano et al., "Polycrystalline CVD Diamond Films with High Electrical Mobility", *Science*, 260, 1310 (1993).
R. D. Rieke et al., "Preparation of Highly Reactive Metal Powders: Some of Their Uses in Organic and Organometallic Synthesis", *ACS Symposium Series*, 133, 223 (1987).
R. D. Rieke et al., "Studies on Unusually Reactive Metal Powders, Preparation of New Organometallic and Organic Compounds Including Potential New Catalysts", *Energy Res. Abstr.*, 10(18), Abstr. #37255 (1985).
G. T. Visscher et al., "Poly(phenylcarbyne): A Polymer precursor to Diamond–Like Carbon", *Science*, 260, 1496 (1993).
T. Yamamoto et al., "A novel Type of Polycondensation Utilizing Transition Metal–Catalyzed C–C Coupling", *Bulletin of the Chemical Soc. of Japan*, 51(7), 2091 (1978).
"Diamondlike material made from network polymer", *Chemistry & Engineering News*, Jun. 7, 1993, p. 28.
F. Flam, "Diamond Know–How at a Bargain Price", *Science*, 262, Nov. 12, 1993, p. 385.
Grant Proposal GM35153–07 Abstracts, Dialog No. 0129996, Oct. 29, 1992.

*Primary Examiner*—Melvyn I. Marquis
*Attorney, Agent, or Firm*—Merchant, Gould, Smith, Edell, Welter & Schmidt

[57] ABSTRACT

Polycarbynes, such as doped polycarbynes, prepared from a soluble source of electrons and an organic monomer or co-monomer containing at least one carbyne group and, optionally, containing a doping agent, in an ethereal, polyethereal, or hydrocarbon solvent are presented. A wide variety of arylcarbyne and/or alkylcarbyne monomers and co-monomers can be combined with a source of electrons soluble in an ethereal, polyethereal, or hydrocarbon solvent to form novel polycarbyne polymers. These polycarbyne polymers can be used to form synthetic diamond materials, fibers, and other materials that can withstand extreme conditions.

23 Claims, 1 Drawing Sheet

PREPARATION OF DOPED POLYCARBYNES

The present invention was made with Government support under Grant No. GM35153 awarded by the National Institute of Health. The Government has certain rights in the invention. This application is a continuation in part of U.S. application Ser. No. 08/152,725, which was filed on Nov. 15, 1993 and is hereby incorporated by reference.

FIELD OF THE INVENTION

The present invention relates to polycarbynes, such as doped polycarbynes. More specifically, the present invention relates to methods for preparing polycarbynes by combining a source of soluble electrons and a carbyne-containing monomer. The present invention also relates to compositions of polycarbynes.

BACKGROUND OF THE INVENTION

Polycarbynes are polymers that can be used for the preparation of diamond-like carbon flints and in applications that require materials to withstand extreme conditions. Extreme conditions are conditions in which many materials typically fail or lose their structural integrity. Some examples of extreme conditions include extreme temperatures and pressures, high shear or tensile forces, and/or corrosive environments. Presently, metals, high performance plastics, diamonds and other high strength materials are used in many applications in which the materials are exposed to extreme conditions. However, these materials can be cumbersome, expensive and difficult to work with.

For example, diamond is used in and has been proposed for many applications in which materials that can withstand extreme conditions are needed. Diamond is a material from which cutting and drilling tools can be made. Diamond components could be ideal for use in car or jet engines. Diamond has been proposed for many electronic applications, such as the material from which microelectronic chips are made, because it has high mobility, a high breakdown strength, and a high radiation hardness. More specifically, diamond circuits could replace silicon circuits in many high performance applications, because diamond has a high resistance to damage from radiation, heat, chemicals and stress.

One advantage of using silicon in electronic circuits is that silicon can be "p-doped" or "n-doped" to tailor the properties of the electronic circuits to particular applications. To date, diamond has not been so easily "n-doped" or "p-doped". With the exception of a few experimental devices, researchers have so far succeeded in using diamond only as a supporting material in circuits made from conventional semiconductors, because they have been limited by the ability to achieve only one of the two main types of doping—"p-doping". "P-doped" diamond materials are those in which added impurity atoms (e.g., boron) attract electrons, creating mobile holes that conduct electricity. To make the equivalent of silicon devices, a technique for "n-type doping" diamond materials is also needed. In an "n-doped" material impurities that surrender some of their electrons (e.g. phosphorous) are used to make the material more conductive.

In addition to the inability to "n-dope" diamond materials, acquiring natural diamond can be very expensive and/or time consuming because of its scarcity and the difficulty with which it is mined. The difficulty of acquiring natural diamond has led to the need for development of synthetic diamond materials. Presently, there are several methods for preparing synthetic diamond materials. These methods include use of heat and pressure. chemical vapor deposition, and ultrasonically generated emulsions. Every year tons of commercially manufactured diamond materials are made by heating graphite to about 1370° C. while subjecting it to about 50,000 atmospheres of pressure. This heat and pressure technique converts graphite's layered sheet-like atomic structure to diamond's three-dimensional tetrahedral crystalline network. This technique, however, is cumbersome and requires large and expensive machinery.

Chemical vapor deposition is a cheaper means of manufacturing synthetic diamond. In this process, carbon-containing gas gets decomposed, with microwaves or some other energy source, and the liberated carbon settles on a surface, such as glass or silicon. As the carbon settles, a thin film of solid diamond or diamond-like material develops. However, this film-forming process has not seen wide commercial success because it is very slow and difficult to control.

A recently developed method for preparing diamond-like materials was reported by Glenn T. Visscher et al. in *Science*, 260, 1496–1498 (1993). This method for preparing diamond-like materials involves transforming a liquid precursor into a synthetic diamond film. In order to achieve the transformation, $\alpha,\alpha,\alpha$-trichlorotoluene is reduced in tetrahydrofuran, using an ultrasonically generated emulsion of a sodium-potassium alloy, to form poly(phenylcarbyne). The poly(phenylcarbyne) is then pyrolized to form a synthetic diamond material. This process is complex and requires a highly explosive alloy to form the intermediate poly(phenylcarbyne).

Using metal compounds to polymerize organohalides is not new in the art. U.S. Pat. No. 5,211,889 issued on May 18, 1993 to Reuben D. Rieke, specifically discloses examples of soluble highly reactive calcium reacting with dihalothiophenes and dihalobenzenes, for example, to form polymeric materials. However, there is no indication that carbyne-containing organohalides, such as $\alpha,\alpha,\alpha$-trichlorotoluene, can form polycarbynes using the highly reactive calcium.

A need exists for a facile, relatively safe and inexpensive method of producing polycarbynes with reasonably high yields. A need also exists for a facile, relatively safe and inexpensive means of n-doping and p-doping polycarbynes. These facile methods should be readily adaptable to the production of a variety of polycarbyne materials. Once produced, polycarbynes, doped or non-doped, can be converted into synthetic diamond films, a plastic material, or other high strength material that maintains its structure in extreme conditions.

SUMMARY OF THE INVENTION

The present invention relates to the composition and preparation of polycarbynes. Certain preferred embodiments of the present invention relate to the composition and preparation of doped polycarbynes. A method for preparation of a polycarbyne, such as a doped polycarbyne, includes contacting a soluble source of electrons with an organic monomer or co-monomer in an ethereal, polyethereal, or hydrocarbon solvent. The organic monomer or co-monomer contains at least one carbyne group and optionally contains a doping agent. The soluble source of electrons is soluble in an ethereal, polyethereal, or hydrocarbon solvent. The term "organic" refers to hydrocarbon-containing groups wherein the majority of atoms are carbon and hydrogen. This includes within its scope alkyl groups, aryl groups, and arylalkyl groups. It is understood that inorganic atoms and/or groups, such as silicon nitrogen, phosphorous, boron, oxygen, and sulfur, can be included within the organic monomers or co-monomers. Such groups or atoms can be present as long as they do not interfere with or participate in polymerization.

The term "doping agent" refers to a group or molecule that contains at least one inorganic atom and/or group that participates in the polymerization to form a doped polycarbyne. The "doping agent" may or may not contain a hydrocarbon-containing group or molecule. For example, $BX_3$ and/or $PX_3$, where X=a halide (e.g., iodine, chlorine, bromine or fluorine), are doping agents, although they do not contain a hydrocarbon group or molecule. The term "doped" refers to an organic compound or group that contains at least one inorganic atom that participates or participated in the polymerization to form a polycarbyne.

The soluble source of electrons can be a highly reactive metal species, which is made by contacting in an ethereal, polyethereal, or hydrocarbon solvent, a metal salt, soluble in an ethereal, polyethereal, or hydrocarbon solvent, with a solubilized reducing agent having a reduction potential of −1.5 volts or more negative relative to the standard electrode (SCE). This highly reactive metal species can then be combined with an organic monomer or co-monomer containing at least one carbyne group and, optionally, containing a doping agent to form a polycarbyne. When the organic monomer or co-monomer contains at least one carbyne group that is bonded to an alkyl group a poly(alkylcarbyne) is formed. When the organic monomer or co-monomer contains at least one carbyne group that is bonded to an arylalkyl group, a poly(arylalkylcarbyne) is formed. When the organic monomer or co-monomer contains at least one carbyne group that is bonded to an aryl group, a poly(arylcarbyne) is formed.

The same type of polymer formation and terminology can be used for monomers and/or co-monomers that contain doping agents. When the organic monomer or co-monomer contains a doping agent and at least one carbyne group that is bonded to an alkyl group a doped poly(alkylcarbyne) is formed. When the organic monomer or co-monomer contains a doping agent and at least one carbyne group that is bonded to an aryl group, a doped poly(arylcarbyne) is formed. When the organic monomer or co-monomer contains a doping agent and at least one carbyne group that is bonded to an arylalkyl group, a doped poly(arylalkylcarbyne) is formed.

Many of these polycarbynes (e.g., doped polycarbynes) are novel polymers. Their compositions vary with the types of alkyl, aryl or arylalkyl carbyne-containing monomers and/or co-monomers polymerized to form these polymers. The compositions of the doped polycarbynes also vary with the type of doping agent used. These polymers can be used to make synthetic diamond materials, polymer fibers and other materials that can withstand extreme conditions.

As used herein, the term "polycarbyne" or "polycarbyne compound" refers to polymers or oligomers containing "alkylcarbyne," "arylcarbyne" or "arylalkylcarbyne" moieties or mixtures thereof. As used herein, the phrase "alkyl" refers to a saturated linear, branched, or cyclic hydrocarbon group, and the phrase "aryl" refers to a mono-, di- or polynuclear aromatic hydrocarbon group. As used herein, the phrase "arylalkyl," or alternatively "alkylaryl," refers to a group containing both aryl and alkyl moieties. The phrase "carbyne" refers to a group having a carbon atom bonded to three leaving groups prior to polymerization. These leaving groups included in the carbyne group are replaced during polymerization either directly or indirectly by another carbyne carbon or an inorganic atom contained in a doping agent.

The phrase "arylcarbyne," as used in the nomenclature of the polymers, monomers, and co-monomers discussed herein, refers to moieties containing one or more carbyne groups bonded to an aryl group. For example, an arylbiscarbyne is an arylcarbyne that contains two carbyne groups attached to an aryl group. A polymer formed from an arylbiscarbyne monomer is a poly(aryldicarbyne). The phrase "bis" is used to describe a monomer that contains two carbyne groups, and the phrase "di" is used to describe a polymer resulting from the polymerization of a bis monomer. The phrase "alkylcarbyne," as used in the nomenclature of the polymers, monomers, and co-monomers discussed herein, refers to moieties containing one or more carbyne groups bonded to an alkyl group. For branched or long chain alkyl groups, the carbyne is bonded to a terminal carbon, e.g. of a methylene group. For example, an alkylbiscarbyne is an alkylcarbyne that contains two carbyne groups attached to an alkyl group. A polymer formed from an alkylbiscarbyne monomer is a poly(alkyldicarbyne). The phrase "arylalkylcarbyne," or alternatively, "alkylarylcarbyne", as used in the nomenclature of the polymers, monomers, and co-monomers monomers, discussed herein, refers to moieties containing one or more carbyne groups bonded to an arylalkyl or an alkylaryl. The phrase "arylcarbyne-alkylcarbyne" or "alkylcarbyne-arylcarbyne" as used in the nomenclature of the polymers, monomers, and co-monomers discussed herein, refers to moieties containing one or more carbyne groups bonded to an aryl group and one or more carbyne groups bonded to an alkyl group. The term "polymer" or "polymeric" is used herein in its most general sense to mean a compound consisting of repeating structural units. The term "monomer" or "monomeric" is used herein in its most general sense to mean a compound consisting of singular structural units. The term "co-monomer" is used herein in its most general sense to mean a compound consisting of more than one molecular type of singular structural units. An organic monomer or co-monomer can contain one or more aryl groups, one or more alkyl groups, and/or one or more arylalkyl groups.

DETAILED DESCRIPTION OF THE PRESENT INVENTION

Figure 1:
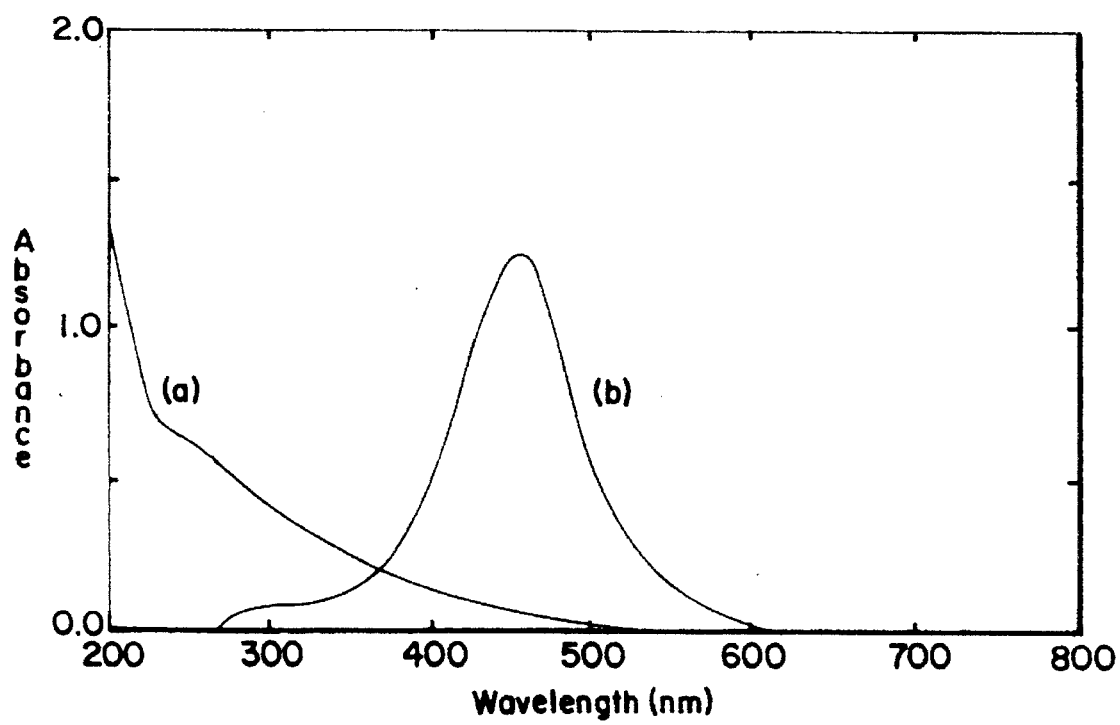
FIG. 1 represents a graph of: (a) UV-vis electronic spectrum (cyclohexane) and (b) fluorescence spectrum (cyclohexane, excitation wavelength=300 nm) of poly(phenylcarbyne) obtained in accord with the present invention.

The present invention is based upon the discovery that a soluble source of electrons can be combined in an ethereal. polyethereal, or hydrocarbon solvent with organic monomers or co-monomers to form polycarbyne polymers. In certain preferred embodiments, the electrons can be combined in an ethereal, polyethereal, or hydrocarbon solvent with doped organic monomers or co-monomers to form doped polycarbyne polymers. By combining the soluble source of electrons with a variety of arylcarbyne monomers or co-monomers, alkylcarbyne monomers or co-monomers, or arylcarbyne-alkylcarbyne co-monomers, arylcarbyne-arylalkylcarbyne co-monomers, alkylcarbyne-arylalkylcarbyne co-monomers, arylalkylcarbyne monomers or co-monomers, for example, new polymers can be formed.

Soluble Source of Electrons

Any source of electrons, soluble in an ethereal, polyethereal, or hydrocarbon solvent, having a reduction potential of −0.2 or more negative, relative to the standard calomel electrode (SCE), can be used to form a polycarbyne from the organic monomers or co-monomers pursuant to the present invention. In accord with the present invention, the soluble source of electrons should be sufficiently soluble in an ethereal, polyethereal or hydrocarbon solvent to react with the monomer or co-monomer in solution. By this it is meant that the reaction with the monomer or co-monomer does not occur on the surface of a solid particle. Preferably, "soluble" refers to a compound that is at least about 0.5 wt-% soluble in an ethereal, polyethereal, or hydrocarbon solvent, and more preferably, at least about 1 wt-% soluble.

Ethereal, polyethereal, or hydrocarbon solvents in which the source of electrons should be soluble include, but are not limited to: ethyl ether, tetrahydrofuran, glyme, diglyme, triglyme, benzene, hexane and the like. If a hydrocarbon solvent is used, it preferably contains a secondary solubilizing agent such as N,N,N',N'-tetramethylethylenediamine (TMEDA), or other diamine or bidentate ligand capable of solubilizing the starting materials and product.

A variety of electron transfer compounds, e.g., macrocyclic, polyethers, crystals, polyenes, and the like, in combination with alkali metals are usable sources of soluble electrons that are capable of interacting with organic monomers or co-monomers to form polycarbynes. Preferably, the soluble source of electrons contains a polyene. More preferably, the soluble source of electrons contains an aromatic polyene, i.e., an arene or polyarylene, such as an aromatic electron-transfer compound. Examples of aromatic electron-transfer compounds include, but are not limited to, biphenyl, naphthalene, and anthracene. Compounds such as these are typically capable of transferring electrons in an oxidation reduction reaction through the formation of radical anions. Specific examples of suitable solubilized sources of electrons include: alkali metal salts of aromatic anions, such salts being, for instance, sodium naphthalenide, lithium naphthalenide, sodium anthracenide, lithium anthracenide, sodium biphenylide or lithium biphenylide; alkali metal-polyether solvate; alkali metal-crown ether solvates; alkali metal-cryptate solvates, etc. Preferably, the soluble source of electrons is an alkali metal arene salt. More preferably, the soluble source of electrons is a combination of an alkali metal cation and an anion of an aromatic electron transfer compound, such as biphenyl, anthracene, or naphthalene. Most preferably the soluble electron source is preformed. Of the preformed alkali metal arene salts, the most preferred is lithium biphenylide.

By "preformed" it is meant that the alkali metal and about 1–1.2 molar equivalents of the arene are allowed to react substantially completely, i.e., until substantially all the alkali metal is consumed, before contacting any monomer in accord with the present invention. The formation of the preformed reducing agent typically takes place in an ethereal, polyethereal, or hydrocarbon solvent, and generally is substantially complete in about two hours.

A variety of alkali metals can be in combination with the macrocyclic polyethers, cryptates, polyenes and the like to form a soluble source of electrons usable in the present invention. Some examples of usable alkali metals in the present invention are: lithium, sodium, potassium, rubidium, cesium and/or mixtures thereof.

Although, use of an alkali metal arene salt as the soluble source of electrons is preferred, a soluble highly reactive metal species can also be prepared and used as a soluble source of electrons in accord with the present invention. In general, the previously discussed sources of soluble electrons, such as an alkali metal arene salt, can be used to reduce soluble metal salts, such as a calcium(II) salt, a barium(II) salt, a strontium(II) salt, a copper I or II salt or mixtures thereof, to form soluble highly reactive metals that are suitable sources of soluble electrons to form polycarbynes. As used herein, the term "highly reactive" refers to the reactivity of a metal species, such as calcium, strontium, barium, copper, or mixtures thereof in organic reactions, particularly oxidative addition reactions. As used herein, a metal species is highly reactive if it reacts with a wide variety of primary, secondary, and particularly tertiary alkyl halides in relatively high yields, for example in greater than about 50% yields, preferably in greater than about 70% yields.

These soluble highly reactive metal species are composed of formally zerovalent metal atoms in combination or in complexation with a solubilizing agent. Preferably, the highly reactive metal species contains formally zerovalent non-alkali metal atoms. By "formally zerovalent" it is meant that the formal oxidation state, or charge, is equal to the group number (i.e., 2 for calcium) minus the number of unshared electrons (i.e., 2 for calcium) minus the number of bonds (i.e., 0 for calcium). Although the formal oxidation state of the metal in the preferred highly reactive metal species is considered to be zero, it is believed that there is significant charge transfer between the metal and the solubilizing agent. By "in combination" or "in complexation with" it is meant that the reduction of the soluble metal salt generates a physical mixture of formally zerovalent soluble metal atoms and the solubilizing agent.

In order to obtain the soluble formally zerovalent metal atoms that are a part of the soluble highly reactive metal species, a soluble metal salt is combined with a solubilized reducing agent in an ethereal, polyethereal or hydrocarbon solvent. Any soluble (as defined above in the description of a soluble source of electrons) metal salt that can be exposed to a solubilized reducing agent in an ethereal, polyethereal or hydrocarbon solvent to form soluble formally zerovalent metal atoms can be used in the method of the present invention. These salts include soluble calcium(II) salts, soluble barium(II) salts, soluble strontium(II) salts and soluble copper(I and/or II) salts. Preferably, soluble highly reactive barium, strontium, or calcium is used in the present invention, at least because copper is more difficult to solubilize. Therefore, soluble barium(II) salts, calcium(II) salts, and strontium(II) salts are preferred salts to form soluble formally zerovalent metal atoms.

The counterion of the soluble metal salt can be any of a variety of anions that does not contain an acidic proton. For example, the anion can be a sulfate, nitrate, nitrite, cyanide, or halide. Preferably, the anion is a cyanide or a halide. More preferably, the anion is F, Cl, Br, or I. Most preferably the anion of the soluble metal salt is Br or I.

Generally, the solubilized reducing agent that is combined with the soluble metal salt to form formally zerovalent soluble metal atoms can be any solubilized reducing agent that is capable of reducing soluble metal salts in an ethereal, polyethereal, or hydrocarbon solvent. Any reducing agent having a reduction potential of −1.5 volts, or more negative, relative to SCE will satisfy this relation. It is preferred, however, if the reducing agent has a reduction potential of −1.8 volts or more negative, and most preferred if the reducing agent has a reduction potential of about −2.0 volts or more negative. Preferably the reduction of the soluble metal salts takes place in an ethereal or polyethereal solvent, and more preferably in tetrahydrofuran.

The solubilized reducing agent can be any of the variety of macrocyclic polyethers, cryptates, polyenes and tile like in combination with alkali metals that are discussed previously as soluble suitable sources of electrons useable in the present invention. Examples of suitable solubilized reducing agents include alkali metal salts of aromatic anions, such salts being, for instance, sodium naphthalenide, lithium naphthalenide, sodium anthracenide, lithium anthracenide, sodium biphenylide or lithium biphenylide; alkali metal-polyether solvates; alkali metal-crown ether solvates; alkali metal-cryptate solvates, etc. Preferably, the reducing agent is an alkali metal arene salt. More preferably, the reducing agent is a combination of an alkali metal cation and an anion of an aromatic electron transfer compound, such biphenyl, anthracene, or naphthalene. Most preferably, the reducing agent is preformed. Of the preformed alkali metal arene salts, the most preferred is lithium biphenylide.

This variety of macrocyclic polyethers, cryptates, polyenes and the like in combination with an alkali metal (e.g., an alkali metal arene salt) can be used directly as the soluble source of electrons, or they can be used as the solubilized reducing agent to form the soluble highly reactive metal species, which act as the soluble source of electrons. Solubilized reducing agents can be combined with a soluble metal salt to form a soluble highly reactive species (i.e., soluble formally zerovalent metal atoms in combination with a solubilizing agent).

The solubilizing agent that is in combination with the formally zerovalent metal atoms can be any of the variety of macrocyclic polyethers, cryptates, or polyenes, and the like discussed previously with respect to the solubilized reducing agent. The solubilizing agent is obtained from the solubilized reducing agent and is preferably capable of interacting with the formally zerovalent metal atoms in such a manner that a less reactive finely divided powder does not precipitate out of solution to any significant extent. By this it is meant that the soluble formally zerovalent metal atoms are preferably substantially completely soluble in an ethereal, polyethereal, or hydrocarbon solvent with only about 20% or less of the soluble metal atoms in a solid state, i.e., a state without any significant interaction with the solubilizing agent.

Preferably, the solubilizing agent, as provided by the solubilized reducing agent to be in combination with the formally zerovalent metal atoms, is a polyene. More preferably, the solubilizing agent contains an aromatic polyene, i.e., an arene or polyarylene, such as an aromatic electron-transfer compound. Thus, in a preferred embodiment, the highly reactive soluble metal species is composed of formally zerovalent soluble metal atoms in combination or in complexation with a polyene in an ethereal or polyethereal solvent.

In accord with the present invention, the soluble highly reactive metal species, such as calcium, barium or strontium, can be in combination with an alkali metal salt wherein the anion does not contain an acidic proton. Because the soluble highly reactive metal species is preferably utilized within a short period of time after its preparation, it can be in complexation with the alkali metal salt produced from the cation of the aromatic reducing agent and the anion of the soluble metal starting material (i.e., soluble metal salt). The alkali metal of the salt can be Li, Na, K, Rb, or Cs. Preferably it is Li, Na, or K, and most preferably it is Li or Na. The anion can be, but is not limited to, a nitrate, nitrite, sulfate, cyanide, and/or halide. Preferably, the anion is a halide or cyanide. Generally, this alkali metal salt is not believed to effect the reactivity of the soluble highly reactive metal species; however, it may facilitate the reactivity of the organic compounds.

In the most specific and preferred embodiment of the soluble highly reactive metal species, as used as a soluble source of electrons in accord with the present invention, the metal species is composed of formally zerovalent soluble metal atoms in combination with or complexed with, biphenyl and a lithium halide in tetrahydrofuran.

Production of the soluble highly reactive metal species is conducted under conditions designed to prevent its reoxidation and substantial precipitation as a metal powder. Generally, these conditions include use of ethereal, polyethereal, or hydrocarbon solvents and the exclusion of oxygen. Also, the conditions are controlled so as to promote the existence of the metal atoms as small soluble clusters and to avoid their agglomeration into larger configurations that could precipitate out of solution. Larger clusters of metal atoms generally means lower solubility and lower reactivity.

Typically, these conditions include temperatures of about 100° C. or less, an inert atmosphere, e.g., an argon, nitrogen or helium atmosphere, a reaction time of about one hour, and an ether or polyether solvent such as diethyl ether, dimethyl ether, tetrahydrofuran and the like, or a hydrocarbon solvent. By "inert" atmosphere it is meant that the atmosphere is not contributing atoms or molecules that are participating in the formation of the soluble source of electrons or in the polymerization process.

Typically, the molar ratio of the solubilized reducing agent to the metal(II) salt, such as a Ca(II) salt, a Ba(II) salt, or a Sr(II) salt, is about 2:1 for a molar equivalent amount; however, the salts can be in excess. Preferably, the salt is present in an amount of about 1.1–2.0 molar equivalents, and more preferably in an amount of about 1.5–2.0 molar equivalents, per mole equivalent of reducing agent. Excess salt is used to ensure there is little or no reducing agent present to interfere with subsequent reactions.

In sum, the polymers in accord with the present invention are made by combining a source of electrons that is soluble in an ethereal, polyethereal, or hydrocarbon solvent with an organic monomer or co-monomer as described herein. Most preferably, the soluble source of electrons is lithium biphenylide or lithium naphthalenide. Alternatively, the soluble source of electrons can be a soluble highly reactive metal species, such as a calcium, barium, or strontium species.

There are at least two methods for preparing the soluble formally zerovalent highly reactive metal species suitable as a soluble source of electrons in accord with the present invention. One method involves a one-step reduction in an ethereal, polyethereal or hydrocarbon solvent of a soluble metal salt, such as a Ca(II), Ba(II) or Sr(II) salt. Specifically, this method includes the reduction of a soluble metal salt in the presence of an alkali metal, such as lithium, sodium or potassium, and an equal molar amount of an electron transfer compound, such as the aromatic electron transfer compound naphthalene or biphenyl. The alkali metal is present in a molar equivalent amount, i.e., in a range of about 1.8–2.2 moles alkali metal per mole of the soluble metal salt being reduced. It is desirable, however, to use a slight excess of the metal salt relative to the alkali metal, to decrease the chance that the reducing agent could interfere with the subsequent use of the highly reactive metal species.

The reduction is typically complete in about 10 hours, and preferably in about five hours, with vigorous stirring of the mixture. For certain embodiments, the reaction is observed to be "complete" when the green color, which is evidence of an alkali metal/aromatic electron transfer complex, disappears. For other embodiments, the reaction is observed to be "complete" when the green color appears, and remains. For still other embodiments, completion of the reduction reaction is evidenced by the disappearance of lithium and/or lack of formation of the bright green lithium naphthalenide anion. Stirring may be necessary during this reaction to prevent the reduced metal from coating unused alkali metal and stopping the reaction.

In this one-step preparation method, the solubilized metal salt, is generally always in excess in the reaction flask, relative to the amount of the alkali metal/electron transfer complex present. Herein, "solubilized" salt means the portion of the metal salt that has gone into solution. For soluble metal salts, this is not necessarily the most preferred method of reduction because the surface of the lithium metal can be coated with metal atoms, which slows down the reduction.

A second method for the preparation of a reactive soluble metal species involves a two-step reduction of a metal salt in an ethereal, polyethereal or hydrocarbon solvent using a preformed reducing agent. By "preformed" it is meant that for each mole of the alkali metal, about 1–1.2 moles of an electron transfer compound are allowed to react substantially completely, i.e., until substantially all the alkali metal is consumed, before contacting any soluble metal salts. The formation of the preformed reducing agent preferably takes place in an ethereal, polyethereal, or hydrocarbon solvent, and generally is substantially complete in less than about eight hours, preferably in less than about two hours.

An approximate molar equivalent amount of the metal salt in a solvent, e.g., $CaCl_2$ in THF, is then slowly (over a period of about 5 to 15 minutes) transferred into the solution of the preformed reducing agent, e.g., lithium naphthalenide in THF. Alternatively, the preformed reducing agent can be added to the metal salt.

The reduction of the metal salt in the second step of this two step method using a preformed reducing agent is typically carried out in less than about eight hours, preferably in less than about two hours, and more preferably in less than about one hour. Preferably, the total reaction time for both steps is less than about eight hours. This two-step method is advantageous for soluble metal salts, when compared to the previously discussed method, at least because it involves a shorter reaction time and it decreases, if not eliminates, the problem of the resultant reduced metal coating the alkali metal. Generally this method forms highly reactive soluble metals of approximately the same reactivity as does the previously discussed method.

The alkali metal complex reducing agents, e.g., lithium naphthalenide, can also be generated by electrochemical reduction of an electron transfer compound, e.g., naphthalene, using an alkali metal salt, e.g., a lithium halide, as the electrolyte. That is, an alkali metal complex reducing agent can be formed electrochemically. This can be carried out in an electrochemical cell containing an ethereal or polyethereal solvent using an electrode of palladium, platinum, carbon, or gold. Useful electrodes can be in any of a variety of forms. They can be solid, porous, or in the form of a slurry. The electrochemical route is advantageous and preferred at least because it avoids the use of alkali metals, which can be quite dangerous.

As a representative example of this procedure, naphthalene can be reduced in an inert atmosphere in the presence of a lithium salt, as the electrolyte, in THF. The electrode can be a large surface area electrode to facilitate the reduction. Once the lithium naphthalenide is formed, it can be transferred to the metal salt, or the metal salt can be transferred to it, for formation of the soluble zerovalent highly reactive metal species.

Once formed the soluble zerovalent highly reactive metal can be isolated and washed to remove any unreacted starting materials, side products, or excess reducing agent, if so desired. It is generally stable and can be stored for several years at temperatures ranging from 0° C. to 30° C. It can be stored in a dry state, in mineral oil as a paste, in an ethereal or hydrocarbon solvent as a suspension, or in a paraffin wax matrix. It is desirable, however, for the zerovalent highly reactive metal to be stored under an inert atmosphere, such as argon, helium or nitrogen.

Carbyne Monomers

Polymers containing carbyne groups can be made from a wide variety of arylcarbyne monomers, arylcarbyne co-monomers, alkylcarbyne monomers, alkylcarbyne co-monomers, arylalkylcarbyne monomers, arylalkylcarbyne co-monomers, arylcarbyne-alkylcarbyne co-monomers, arylcarbyne-arylalkylcarbyne co-monomers, and alkylcarbyne-arylalkylcarbyne co-monomers. When the soluble source of electrons is combined with one of these types of monomers or co-monomers in an ethereal, polyethereal, or hydrocarbon solvent, polycarbynes are formed. Moreover, when the soluble source of electrons is combined in an ethereal, polyethereal, or hydrocarbon solvent with one of these types of monomers or co-monomers, and one of these monomers or co-monomers is doped, doped polycarbynes are formed. In addition, when the soluble source of electrons is combined in an ethereal, polyethereal, or hydrocarbon solvent with one of these types of monomers or co-monomers and a doping agent, doped polycarbynes are formed.

A variety of aryl, alkyl and/or arylalkyl carbyne-containing monomers and co-monomers can be polymerized in accord with the present invention. For example, any arylcarbyne monomers and any alkylcarbyne monomers, such as alkylmonocarbyne monomers, arylbiscarbyne monomers, alkylbiscarbyne monomers, arylbiscarbyne monomers, alkyltriscarbyne monomers and aryltriscarbyne monomers, and mixtures thereof can be polymerized in accord with the present invention. Specific examples include: $\alpha,\alpha,\alpha$-trichlorotoluene, 1,1,1-trichloropentane, 1,1,1-tribromopropane, 1,1,1,5,5,5-hexachloropentane, and 2-trichloromethylnaphthalene.

In addition, these monomers can be combined into co-monomers and polymerized. Two or more types of arylcarbyne molecules can be combined to form an arylcarbyne co-monomer, two or more types of alkylcarbyne molecules can be combined to form an alkylcarbyne co-monomer and two or more types of arylalkylcarbyne molecules can be combined to form an arylalkylcarbyne co-monomer. In addition, one or more types of alkylcarbyne molecules can be combined with one or more types of arylcarbyne molecules to form an arylcarbyne-alkylcarbyne co-monomer. For example, arylmonocarbyne-arylbiscarbyne co-monomers, alkylmonocarbyne-alkylbiscarbyne co-monomers, arylmonocarbyne-alkylmonocarbyne co-monomers, arylmonocarbyne-alkylbiscarbyne co-monomers, arylbiscarbyne-alkylbiscarbyne co-monomers, alkylmonocarbyne co-monomers (i.e., two or more different types of alkyl containing molecules can be co-monomers), arylmonocarbyne co-monomers (i.e., two or more different types of aryl containing molecules can be co-monomers), and any other mixture or combination variations of alkylcarbyne, arylcarbyne and/or arylalkylcarbyne co-monomers can all be polymerized to form polycarbyne polymers in accord with the present invention.

Moreover, any of the molecules or groups contained in any of these types of monomers or co-monomers can be doped and combined with non-doped types of monomers or co-monomers to form doped polycarbynes. For example, a doped phenylcarbyne, such as dichlorophenylphosphine, can be combined with an undoped phenylcarbyne, such as α,α,α-trichlorotoluene, to form a phenylcarbyne co-monomer. This co-monomer can be polymerized in accord with the present invention to produce a doped poly(phenylcarbyne).

In addition to the doping agent being a doped organic monomer or co-monomer such as dichlorophenylphosphine, the doping agent can be an inorganic group or molecule such as $BCl_3$. Any inorganic atom or group that participates in but does not interfere with the polymerization process can be included in an organic molecule or group to form a doped polycarbyne. The doping agent must be such that an inorganic atom contained in the agent can bond with a carbon contained in a carbyne group of the organic monomer or co-monomer that is polymerized to form the doped polycarbyne. Preferably, the inorganic atom is boron, nitrogen, arsenic, antimony, bismuth, sulfur, selenium, or phosphorous.

In order for the inorganic atom contained in the doping agent to bond to a carbon contained in a carbyne group during polymerization, the doping agent must contain leaving groups that allow bonds to form between inorganic atoms of the doping agent and carbon atoms contained in the carbyne group. For example, a phosphorous containing doping agent can contain a maximum of three leaving groups bonded to a phosphorous atom (e.g., $PCl_3$). The discussion below with respect to leaving groups contained in a carbyne group also applies to the leaving groups bonded to any inorganic atom (other than nitrogen) that is contained in a doping agent.

If the inorganic atom contained in the doping agent is nitrogen, then the following leaving groups can be included within the electrophilic aminating agents (i.e., nitrogen-containing doping agents): tosylates, brosylates, nosylates, mesylates, triflates, acetates, benzoates. Other electrophilic aminating agents include: azidomethyl phenyl sulfide, diphenyl phosphorazide, tosyl azide, alkoxy amines, and ortho-phosphinyl-N,N-dimethylhydroxylamines.

The polycarbyne polymers formed from co-monomers can be block and/or random polymers. As used herein, the term "block" refers to a polymer in which molecules of the same type are grouped together in particular sections of the polymer chain. As used herein, the term "random" refers to a polymer in which molecules of the same type may or may not be grouped together in a particular part of the chain.

The carbyne-containing monomers and/or co-monomers can also contain non-carbyne-containing functional groups or inorganic atoms or groups. Any such group that does not become involved in or interfere with the polymerization in an ethereal, polyethereal or hydrocarbon solvent, can be contained in the carbyne-containing monomer or co-monomer of the present invention. For example, nitrile and/or ether groups can be attached to an aryl group and/or alkyl group in an arylcarbyne monomer or co-monomer, alkylcarbyne monomer or co-monomer, arylalkylcarbyne or arylcarbyne-alkylcarbyne co-monomer. Therefore, the resulting polymer can contain carbyne groups and other functional groups. Other groups, such as those containing nitrogen, sulfur, phosphorus, oxygen, and silicon may also be included in the carbyne containing monomer or co-monomer. These groups, as opposed to doping agents, should not participate in or interfere with the polymerization process.

The number of carbyne groups and other functional groups contained in the monomer or co-monomer, and thus, the resulting polymer, can vary with the type of characteristics and/or properties required by the situation in which the polymer is to be used. The molecule(s) selected to be included in the monomer or co-monomer will dictate what functional groups will be included in the polymer, the number and location of the carbyne groups bonded to the aryl and/or alkyl groups in the polymer, and many of the polymer's physical properties.

In accord with the present invention the carbyne group(s) can be bonded to an alkyl group contained in a monomer or co-monomer or to any position on an aryl group in a monomer or co-monomer. For branched or long chain alkyl groups, the carbyne is bonded to a terminal carbon, e.g., of a methylene group. Monomers and co-monomers containing one or more carbyne groups can be polymerized using the methods of the present invention. Monomers and co-monomers containing at least two carbon atoms are useable for the present invention. However, monomers and/or co-monomers with at least three carbon atoms and not more than 200 carbon atoms are preferred. Monomers and/or co-monomers that have at least three and not more than 100 carbon atoms are more preferred.

As the variety of molecular structures included in the monomers and/or co-monomers increases, the resulting polycarbyne polymers can have higher molecular weights, and as the number of different types of molecules included in the monomers or co-monomers increases, the polymers become more soluble. For example, a polycarbyne formed from an arylmonocarbyne-arylbiscarbyne co-monomer typically will have a higher molecular weight and be more soluble in an ethereal, polyethereal or hydrocarbon solvent than a polycarbyne formed from an arylmonocarbyne monomer. In addition, a polycarbyne formed from an arylmonocarbyne-alkylmonocarbyne co-monomer will typically have a higher molecular weight and be more soluble than a polycarbyne formed from an arylmonocarbyne-arylbiscarbyne co-monomer because the latter carbyne co-monomer will be less soluble in an ethereal, polyethereal or hydrocarbon solvent, and thus, will not form chains with a molecular weight as high as a more soluble monomer or co-monomer.

Co-monomers could be utilized in applications requiring higher molecular weight, more soluble, and more amorphous polymers, such as those applications in which films or fibers are formed. For example, arylcarbyne and/or alkylcarbyne co-monomers could be formed into sheets and treated, preferably pyrolized to make a synthetic diamond material or formed into fibers to make ropes or protective clothing. Applications requiring harder, stronger, and more crystallized polymers would use an arylcarbyne or alkylcarbyne monomer. For example, arylcarbyne or alkylcarbyne monomers would form polymers that could replace metals.

During polymerization of an alkyl and/or aryl carbyne monomer or co-monomer, the three leaving groups forming the carbyne group with a carbon atom are replaced either directly or indirectly by carbon or an inorganic atom contained in a doping agent. Leaving groups should be ions that can be replaced by carbon atoms or inorganic atoms contained in a doping agent. Preferably, the leaving groups are easily replaced by carbon atoms or inorganic atoms of a doping agent in an ethereal, polyethereal, or hydrocarbon solvent.

Some examples of leaving groups that could be included in the carbyne or doping agent group in accord with the present invention are as follows: a halide, a tosylate, a cyanide, an ammonium salt, a phosphonium salt, a triflate, a nitrate, a sulfate, and/or a nitrile. Preferably, the leaving groups included in the carbyne group are halides, and most preferably, chlorides.

Two or three of these types of leaving groups can be single bonded to an inorganic atom to form a doping agent in accord with the present invention. If the doping agent contains only two leaving groups, then the third group or atom bonded to boron or phosphorous, for example, can be an organic group. This organic group could be any aryl, alkyl, or arylalkyl group, as discussed below, useable as a monomer or co-monomer to form a doped polycarbyne. If the doping agent contains three leaving groups, then the doping agent, such as B(leaving group)$_3$, may not contain any organic groups.

Three of the aforementioned types of leaving groups are attached to a carbon atom to form a carbyne group, and the carbyne group can be attached to a wide variety of aryl and alkyl monomer and/or co-monomers, which can then be polymerized to form polycarbyne polymers. Preferably, the carbyne group is attached to an aryl compound that polymerizes into a poly(arylcarbyne) when combined with the soluble source of electrons. The aryl monomers can have one or more aromatic rings, and the carbyne groups can be attached to any position on the aryl moiety. For example, carbyne groups can be attached to the para, ortho or meta positions of one or more phenyl groups. Some examples of aryl monomers that can be used in the present invention include, but are not limited to $\alpha,\alpha,\alpha$-trihalotoluene, 1- or 2-trihalomethylnaphthalene, 1,4-bis(trihalomethyl)-benzene, 2-trihalomethylanthracene, and the like. Preferably, a trihalotoluene, such as $\alpha,\alpha,\alpha$-trichlorotoluene or 1,4-bis-(trichloromethyl)-benzene is used in the present invention.

In accord with the present invention, the aryl group in the monomer could be replaced with an alkyl group. In this embodiment, the soluble source of electrons reacts with a carbyne-containing alkyl monomer or co-monomer to form a poly(alkylcarbyne) polymer. Some examples of carbyne-containing alkyl monomers that can be used in the present invention include, but are not limited to: 1,1,1-trihalopropane, 1,1,1,3,3,3-hexahalopropane, 1,1,1-trihalobutane, 1,1,1,5,5,5-hexahalopentane or 1,1,1-trihalopentane and the like.

In another embodiment, aryl and/or alkyl carbyne-containing compounds can be combined to form a co-monomer that can be polymerized in accord with the present invention. Different alkyl or aryl- or alkylaryl- carbyne-containing molecules can be combined to form a co-monomer. For example, a 1,1,1-trihalopentane can be combined with a 1,1,1,-trihalobutane to form an alkyl co-monomer, which polymerizes into a poly(alkylcarbyne), or a 2-trihaloanthracene can be combined with an $\alpha,\alpha,\alpha$-trihalotoluene to form a poly(arylcarbyne).

Moreover, an arylcarbyne-containing compound and an arylbiscarbyne-containing compound can be combined in virtually any proportional amounts to form an arylbiscarbyne-arylmonocarbyne co-monomer, for example. In addition, an alkyl carbyne-containing compound can be combined with an alkylbiscarbyne-containing compound to form an alkylbiscarbyne-alkylmonocarbyne co-monomer. These co-monomers polymerize into soluble poly(arylcarbyne) and poly(alkylcarbyne) compounds that can exhibit higher molecular weights and higher yields (i.e., over 80%). The films made of these novel polymers can also exhibit less cracking and more adhesion than films of polymers formed from a monomer containing one type of arylcarbyne or alkylcarbyne molecule. Although the mono alkylcarbyne and bisalkylcarbyne and the monoarylcarbyne and bisarylcarbyne co-monomers can be combined in any proportion to form an alkylcarbyne co-monomer and/or an arylcarbyne co-monomer in accord with the present invention, a mono and bis co-monomer with 40% or less of the bis-molecule is preferred.

A monomer, in accord with the present invention, may contain any number of different types of molecules. Furthermore, several different alkylcarbyne-containing molecules may be combined to form a co-monomer, several different arylcarbyne-containing molecules, for example, may be combined to form a co-monomer, or several different aryl and alkyl carbyne-containing molecules may be combined to form a co-monomer. Any monomer useable in the present invention is available commercially or can be prepared by a specialty chemical company, such as Aldrich Chemical Co. in Milwaukee, Wis. The carbyne molecules that form a co-monomer can be combined in any proportional amount in an ethereal, polyethereal or hydrocarbon solvent to form a co-monomer. The number of and amount of the different molecules included in the co-monomer will be dependent upon the application in which the resulting polycarbyne will be used. The amount of each different type of molecule in a co-monomer to be polymerized into a synthetic diamond material, for example, can vary, but preferably will contain no more than 40 mol-% of one type of molecule.

The source of soluble electrons and the organic monomers and co-monomers are combined under conditions to preserve the reactivity of the soluble source of electrons. These conditions include atmospheric pressure, relatively low temperatures (i.e., less than about 100° C.), and an environment containing an inert gas. Preferably, the source of soluble electrons and the organic reactants are combined in an ethereal, polyethereal, or hydrocarbon solvent under an inert gas, such as argon, nitrogen and/or helium, at temperatures well below 100° C. More preferably, the source of soluble electrons and the aryl and/or alkyl reactants are combined in an ethereal or polyethereal solvent under argon at temperatures below 0° C. After combining the reactants at low temperatures, the mixture is then warmed to room temperature (i.e., 25° C. to 30° C.) and refluxed at a higher temperature. The reaction mixture is then cooled to room temperature and water is added slowly. The organic and aqueous layers are separated by any means well-known in the art, and the organic layer is filtered and concentrated under vacuum. Addition of a solvent, such as methanol to the organic layer, gives a precipitate, which should be collected by filtration and purified by reprecipitation with a solvent such as ethanol, from the ethereal, polyethereal, or hydrocarbon solvent. The product should then be dried under vacuum.

Polycarbyne Polymers

Generally, the resulting polycarbynes are novel. These polycarbynes have a tetrahedral three dimensional network, which is formed during polymerization and is much like the three dimensional network of natural diamond. This tetrahedral three dimensional network differentiates polycarbynes from other two dimensional linear or branched polymers that have the same formulas as polycarbynes. These polycarbynes are, typically, solid strong polymers that withstand extreme conditions and can be used to from a variety of types of materials. For example, these polymers can be resolubilized to form films and then pyrolized, or otherwise appropriately treated, to make synthetic diamond materials. These polycarbynes can be resolubilized to form fibers and filaments to make protective clothing. Many of these novel polyarylcarbynes and/or polyalkylcarbynes and the like can be used to replace metal and other hard solid materials. Some examples of these resulting polymers include: poly(phenylcarbyne), poly(phenyldicarbyne), poly(methyldicarbyne), poly(propylcarbyne) and the like.

The present invention, typically, provides reasonably high yields of these polycarbynes. Preferably, the yields in accord with the present invention are at least about 30%, more preferably at least about 40%, and most preferably at least about 60%.

The molecular weights of these polymers can vary according to the application for which they are used. Preferably, the polymers have an average molecular weight of at least about 5,000. More preferably, the polymers have an average molecular weight of at least about 10,000 and not greater than about 200,000. The number of monomer units that are included in the polymer can also vary. The length of the polymer is typically determined by the type of polymeric material to be formed, and the application in which the polymeric material will be used. There are at least two monomer units in the polymer. Preferably, the number of monomer units included in the polymer is at least two and not greater than about 500,000. More preferably, there at least about 10 and not more than about 100,000 monomer units included in the polymer.

Overall, the polycarbyne polymer has a three-dimensional tetrahedral structure much like natural diamond. During polymerization, the leaving groups, attached to the carbon atom that is included in the carbyne group, are replaced by the carbon atoms included in the carbyne groups of other monomer or co-monomer molecules and/or inorganic atoms included in the doping agents, and the number of carbon-carbon and/or carbon-inorganic atom bonds increases. Due to the large number of carbon-carbon bonds, the resulting polymer can withstand a variety of extreme conditions.

The following are examples of general configurations for polycarbyne polymers in accord with the present invention. The first formula (1) represents a polycarbyne formed from a monocarbyne monomer.

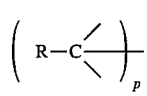
(1)

The "R" represents the aryl, alkyl or arylalkyl group containing at least one carbon and not more than 100 carbon atoms that is bonded to the carbyne group in the monocarbyne monomer. In this particular representation R is the same throughout the polymer. Preferably, "R" contains at least one and not more than 50 carbon atoms, and more preferably not more than 25 carbon atoms. If R is an aryl group, it preferably has at least seven carbon atoms and more preferably at least ten carbon atoms. The "p" represents the number of monomer units contained in the polycarbyne polymer and is at least two. Preferably, "p" is at least three and not greater than about 500,000. More preferably, "p" is at least three and not greater than about 100,000.

The second formula (2) represents a doped polycarbyne formed from a monocarbyne co-monomer.

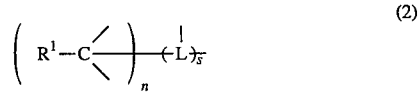
(2)

The "L" represents an inorganic atom, such as boron or phosphorous, contained in the doping agent. The "s" represents the number of units of each doping agent contained in the polymer. Preferably, "s" is at least two and not greater than about 100,000. More preferably, "s" is at least two and not greater than about 20,000. The dotted line between the doping agent and the carbyne containing unit represents the fact that the carbyne group may be bonded to the inorganic atom contained in the doping agent or that the carbyne group may be bonded to another carbyne group contained in a carbyne containing unit. If the polymer is block the carbyne group most likely will be bonded to another carbyne group, and if the polymer is random the carbyne group may be bonded to a doping agent.

The third formula (3) represents a polycarbyne formed from a monocarbyne co-monomer containing two different types of monocarbyne molecules.

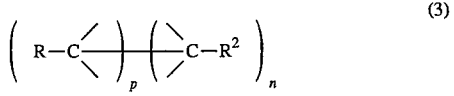
(3)

The "$R^1$" represents the aryl, alkyl or arylalkyl group containing at least one carbon and not more than 100 carbon atoms that is bonded to the carbyne group in one of the monomer units contained in the co-monomer. The "$R^2$" represents the aryl, alkyl or arylalkyl group containing at least one carbon and not more than 100 carbon atoms that is bonded to the carbyne group in another monomer unit contained in the co-monomer. The aryl, alkyl or arylalkyl group of $R^1$ is different from the aryl, alkyl or arylalkyl group of $R^2$. Preferably, $R^1$ and $R^2$ each contain at least two carbon atoms and not more than 50 carbon atoms, and most preferably each does not contain more than 25 carbon atoms. The "p" represents the number of $R^1$ monocarbyne molecules contained in the polycarbyne and is at least one. Preferably, p is at least one and less than about 500,000. More preferably, p is at least one and less than about 100,000. The "n" represents the number of $R^2$ monocarbyne molecules contained in the polycarbyne, and n is at least one. Preferably, n is at least one and less than about 500,000. More preferably, n is at least one and less than about 100,000. Most preferably, the sum of p and n is not greater than about 100,000. The dotted line representing the bond between the carbyne groups contained in each type of molecule indicates that the molecules can be in a random or block sequence in the polymer chain. Additional formulas can be written for three or more monocarbyne molecules that each contain different "R" groups. In general, the polycarbynes resulting from all of the varieties of monocarbyne monomers and monocarbyne co-monomers useable in the present invention are represented by formula (4).

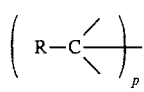  (4)

As shown by formulas (1), (2) and (3), R can be the same or different, and preferably, each different R contains at least one and not more than 100 carbon atoms. More preferably, each different R contains at least two and not more than 50 carbon atoms. Most preferably, each different R contains at least two and not more than 25 carbon atoms. If R is the same in each monomer unit and is an aryl group, it preferably has at least seven carbon atoms and more preferably at least ten carbon atoms. The "p" in formula (4) is at least two and represents the number of monomer units in the polycarbyne. Preferably, p is at least two and not greater than about 500,000. More preferably, p is at least two and not greater than about 100,000. A polycarbyne formed from a monocarbyne co-monomer may be in a random or block sequence.

Formula (5) is a general formula for a doped polycarbyne resulting from all of the varieties of monocarbyne monomers and monocarbyne co-monomers useable in the present invention.

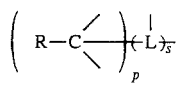  (5)

The "L" represents an inorganic atom, such as boron or phosphorous, contained in the doping agent. L can be the same or different from monomer unit to monomer unit or from co-monomer unit to co-monomer unit. The "s" represents the number of units of each doping agent contained in the polymer. Preferably, "s" is at least two and not greater than about 100,000. More preferably, "s" is at least two and not greater than about 20,000. The dotted line between the doping agent and the carbyne containing unit represents the fact that the carbyne group may be bonded to the inorganic atom contained in the doping agent or that the carbyne group may be bonded to another carbyne group contained in a carbyne-containing unit. If the polymer is block the carbyne group most likely will be bonded to another carbyne group, and if the polymer is random the carbyne group may be bonded to a doping agent.

The same type of general formula can represent a polydicarbyne, which is formed from a biscarbyne monomer or a biscarbyne co-monomer. Formula (6) represents the general formula for a polydicarbyne. As stated above, R can be the same or different, from monomer unit to monomer unit, and when R is different, a random or block polymer can be formed.

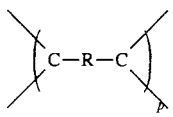  (6)

As shown above, this monomer may be doped to form a doped polydicarbyne polymer. Moreover, the same type of formula can represent a polycarbyne formed by combining at least one monocarbyne molecule and one biscarbyne molecule. Formula (7) represents a polycarbyne formed from a monocarbyne-biscarbyne co-monomer.

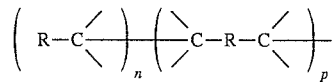  (7)

In formula (7), as previously stated, R can be the same or different, and when R is different, a random or block polymer can be formed. The "n" represents the number of monocarbyne molecules in the polymer, and the "p" represents the number of biscarbyne molecules in the polymer. The "n" is at least one. The "p" is at least one. The sum of n and p is the total number of monomer units in the polymer. The sum of n and p is at least two and preferably, at least two and not greater than about 500,000. Most preferably, the sum of n and p is at least two and not greater than 100,000. Polycarbynes can also be formed from monomers and/or co-monomers containing molecules that have more than two carbyne groups. As shown by formula (7), molecules containing more than one carbyne group can combine with molecules containing one or more carbyne groups to form a co-monomer. The co-monomer can also contain a doping agent as shown by formula (8).

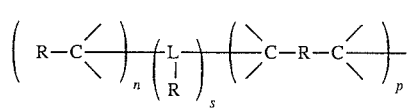  (8)

The "L" represents an inorganic atom, such as boron or phosphorous, contained in the doping agent, and as stated above, L can be the same or different. As shown in formula (8), the L can be bonded to an "R" group (i.e. an aryl, alkyl and/or arylalkyl) to form a doping agent. Moreover, the L can be bonded to an R group that is also bonded to a carbyne group. The "s" represents the number of units of each doping agent contained in the polymer. Preferably, "s" is at least two and not greater than about 100,000. More preferably, "s" is at least two and not greater than about 20,000. The dotted, line between the doping agent and the carbyne containing unit represents the fact that the carbyne group may be bonded to the inorganic atom contained in the doping agent or that the carbyne group may be bonded to another carbyne group contained in a carbyne-containing unit.

Formula (9) represents the three dimensional tetrahedral network of any non-doped polycarbyne in accord with the present invention.

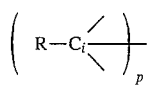  (9)

The "i" represents the number of carbyne groups in a monomer or co-monomer unit and can vary from monomer unit to monomer unit or co-monomer unit to co-monomer unit. Their is at least one carbyne group in each monomer or co-monomer unit. R as stated above, can be the same or different, and when different, a random or block polymer can be formed. The "p" represents the number of monomer units in the polymer and is at least two. Preferably, p is at least two and not greater than about 500,000. More preferably, p is at least two and not greater than about 100,000.

Formula (10) represents the three-dimensional tetrahedral network of any doped polycarbyne in accord with the present invention.

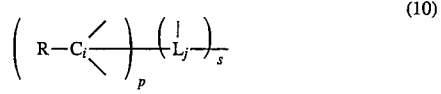  (10)

The "j" represents the number of different types of inorganic doping atoms in a monomer or co-monomer unit, and j can be the same or different in each unit. Them is at least one carbyne group in each monomer or co-monomer unit. R as stated above can be the same or different, and an R group may be attached to the inorganic atom represented by "L" in accord with the present invention. L, as stated above, may be the same or different from unit to unit. The "s" represents the number of doping agent units in the polymer. Preferably, "s" is at least two and not greater than about 100,000. More preferably, "s" is at least two and not greater than about 20,000. The dotted line between the doping agent and the carbyne containing unit represents the fact that the carbyne group may be bonded to the inorganic atom contained in the doping agent or that the carbyne group may be bonded to another carbyne group contained in a carbyne-containing unit.

As required, detailed embodiments of the present invention are disclosed herein. However, it is to be understood that the disclosed embodiments are merely exemplary of the present invention which may be embodied in various systems. Therefore, specific details disclosed herein are not to be interpreted as limiting, but rather as a basis for the claims and as a representative basis for teaching one skilled in the art to variously practice the present invention.

EXPERIMENTAL EXAMPLES $^1$H NMR (CDCl$_3$) spectra were obtained using an Omega-500 (500 MHz) or an Omega-300 (300 MHz) NMR spectrometer. All chemical shifts are reported in parts per million ($\delta$) downfield from internal tetramethylsilane. Fully decoupled $^{13}$C NMR spectra and were obtained from an Omega-500 (500 MHz) or an Omega-300 (300 MHz) NMR spectrometer. The center peak of CDCl$_3$ (77.0 ppm) was used as the internal reference. IR spectra were taken on an Analect RFX-65 Fourier Transform Infrared (FTIR) spectrometer. The spectra were taken with neat polymer film cast from CHCl$_3$ solution on NaCl disks. Fluorescence spectra were taken on a Shimadzu RF-540 spectrofluorophotometer with a polymer solution of cyclohexane (excitation wavelength=300 nm). UV-vis spectra were taken on a Shimadzu UV 160 U recording spectrophotometer with polymer solution in cyclohexane. Low-temperature reactions were performed utilizing a Neslab Endocal™ ULT-80 refrigerated circulating bath or utilizing dry ice/acetone baths. All manipulations were carried out on a dual manifold vacuum/argon system. The Linde™ prepurified grade argon was further purified by passing it through a 150° C. catalyst column (BASF™ R3-11), a phosphorous pentoxide column, and a column of granular potassium hydroxide. Lithium and naphthalene. biphenyl, or anthracene were weighed out and charged into reaction flasks under argon in a Vacuum Atmospheres Company dry box. Molecular weights were determined on a Waters GPC (relative polystyrene standard) with a Waters Ultrastyragel linear column at room temperature using tetrahydrofuran (THF) as the eluent. Tetrahydrofuran was freshly distilled under argon from sodium-potassium alloy. Pentane was dried over a sodium-potassium alloy. Reagents were purchased from Cerac, Inc. or Aldrich Chemical Co., both of Milwaukee, Wis.

EXAMPLE 1

Preparation of Phosphorous Doped Poly(phenylcarbyne) Using Lithium Biphenylide

Lithium (0.06 mol) and biphenyl (0.066 mol) in a 100 ml flask were stirred in freshly distilled tetrahydrofuran (THF) (50 ml) at room temperature under argon until the lithium was completely consumed (approx. 2 hours). To a solution of $\alpha,\alpha,\alpha$-trichlorotoluene (0.018 mol) and dichlorophenylphosphine (0.003 mol) in 20 ml dry THF in a 250 ml flask, the preformed lithium biphenylide was transferred at a controlled rate over 30 minutes via cannula at −78° C. The total equivalent ratio of chlorine atoms to Li$^+$Biph$^-$ is 1:1. The reaction mixture was then warmed to room temperature and refluxed for 12 hours at 67° C. The reaction mixture was then cooled to room temperature. Distilled water (100 ml) was added slowly to the reaction mixture, and then the reaction mixture was stirred at room temperature for two hours. The organic layer was then separated from the aqueous layer. The organic layer was filtered and concentrated in volume to 50 ml under a vacuum. Methanol (150 ml) was added to the organic layer, and the brown precipitate was collected by filtration and purified by reprecipitation with ethanol and THF solution twice. The brown precipitate was then dried under a vacuum at room temperature for 24 hours. The yield was 1.24 g or 64% of phosphorous doped poly(phenylcarbyne).

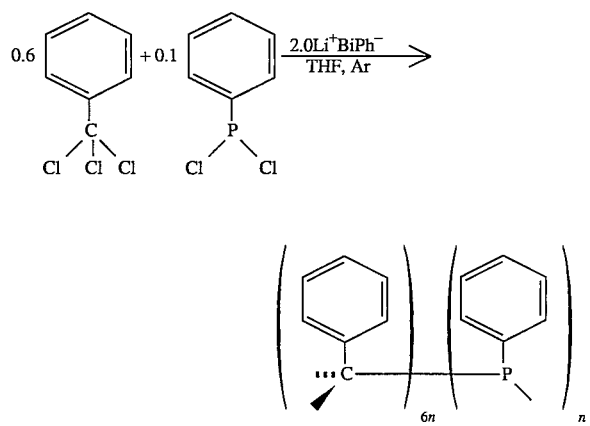

The spectral analysis (FTIR, $^1$H & $^{13}$C NMR, UV, Fluorescence) proved the polymer obtained using this methodology was phosphorous doped poly(phenylcarbyne). The poly(phenylcarbyne) is a random three-dimensional network. The $^1$H NMR spectrum (500 MHz, CDCl$_3$) displayed a dominant aromatic proton resonance at 7.4 parts per million (ppm) (Br, C$_6$H$_5$). The $^{13}$C NMR spectrum (500 MHz, CDCl$_3$) exhibited tour resonances, one center at 140 ppm is attributed to the ipso-carbon of phenyl ring, and an intensive resonance at 128 ppm is caused by the other five carbons of phenyl ring, a very broad resonance center, on at 47 ppm (Br, C$_6$H$_5$), and one at 68 ppm that is denoted to the quaternary carbon connected to the phosphorous atom.

$^{31}$P NMR (200 MHz, CDC13) resulted in a very broad resonance centered at 33 ppm relative to triphenyl phosphine. FTIR (film cast from CHCl$_3$ solution onto NaCl disc) resulted in an absorption spectrum of: 3056(s), 3026(s), 2931(w), 1948(w), 1886(w), 1803(w), 1599(s), 1442(s), 1437(s), 1217(m), 1182(m), 1107(m), 1030(m), 754(s) and 696 cm$^{-1}$(s). 1437 cm$^{-1}$ is a new absorption compared to pure poly(phenylcarbyne). This peak is denoted to the absorption by a P—C bond. Neither P—H (2300–2500 cm$^{-1}$) nor PH$_2$ (2200–2400 cm$^{-1}$) absorptions were observed. UV-vis (cyclohexane): $\lambda_{max}$=218 nm with a shoulder at 245 nm. Elemental analysis for (C$_6$H$_5$C)$_{6n}$(C$_6$H$_5$P)$_n$: Calculated: C, 89.72; H, 5.45; P, 4.83. Found: C, 88.19; H, 5.10; P, 4.39.

EXAMPLE 2 preparation of Doped Poly(phenylcarbyne) Using Highly Reactive Calcium

Lithium (0.06 tool) and biphenyl (0.066 mol) in a 100 ml flask are stirred in freshly distilled tetrahydrofuran (THF) (40 ml) at room temperature under argon until the lithium is completely consumed (approx. 2 hours). To a well-suspended solution of CaI$_2$ (0.03 mol) in THF (40 ml) in a 250 ml flask, the preformed lithium biphenylide is transferred via cannula at room temperature (i.e., about 25° C. to about 30° C.). The solution of highly reactive calcium is stirred for one hour at room temperature. The highly reactive calcium is dark-green in color and is essentially homogeneous in THF. A solution of α,α,α-trichlorotoluene (0.018 mol) and dichlorophenylphosphine (0.003 mol) in 20 ml dry THF are then added via a cannula at −78° C. The reaction mixture is then warmed to room temperature and refluxed for 12 hours at 67° C. The reaction mixture is then cooled to room temperature, and 100 ml of water are added slowly. The mixture is then stirred at room temperature for two hours. The organic layer is then separated from the aqueous layer. The organic layer is filtered and concentrated in volume to 50 ml in a vacuum. Addition of methanol (150 ml) to the organic layer gives a tan precipitate, which is collected by filtration and purified by reprecipitation with ethanol from a THF solution.

EXAMPLE 3

Preparation of Poly(phenylcarbyne) Using Highly Reactive Calcium

Lithium (0.06 mol) and biphenyl (0.066 mol) in a 100 ml flask were stirred in freshly distilled tetrahydrofuran (THF) (40 ml) at room temperature under argon until the lithium was completely consumed (approx. 2 hours). To a well-suspended solution of CaI$_2$ (0.03 mol) in THF (40 ml) in a 250 ml flask, the preformed lithium biphenylide was transferred via cannula at room temperature (i.e., about 25° C. to about 30° C.). The solution of highly reactive calcium was stirred for one hour at room temperature. The highly reactive calcium is dark-green in color and is essentially homogeneous in THF. A solution of α,α,α-trichlorotoluene (0.019 mol) in 10 ml dry pentane was then added via a cannula at −78° C. The reaction mixture was then warmed to room temperature and refluxed for four hours at 67° C. The reaction mixture was then cooled to room temperature, and 100 ml of water were added slowly. The organic layer was then separated from the aqueous layer. The organic layer was filtered and concentrated in volume to 25 ml under vacuum. Addition of methanol (100 ml) to the organic layer gave a tan precipitate, which was collected by filtration and purified by reprecipitation with ethanol from a THF solution. The yielded tan powder was dried at 100° C. under vacuum for 24 hours, giving 0.80 g (46%) of poly(phenylcarbyne).

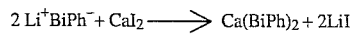

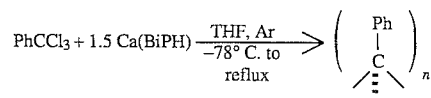

The spectral analysis (FTIR, $^1$H & $^{13}$C NMR, UV, Fluorescence) proved the polymer obtained using this methodology was almost exactly the same as the poly(phenylcarbyne) reported by Visscher et al. in *Science*, 260, 1496–1499 (1993). The poly(phenylcarbyne) is a random three-dimensional network. Infrared spectra showed only monosubstituted phenyl groups present (strong absorbance at 698 cm$^{-1}$ (δmono$_1$) and 756 cm$^{-1}$ (δmono$_2$) for two out-of-plane vibrations of monosubstituted benzene ring). No absorbance of di- and tri-substituted benzene rings was found. No absorbance of aliphatic C=C was found. The $^1$H NMR spectrum displayed a dominant aromatic proton resonance at 7.3 parts per million (ppm). The terminal proton of the polymer network caused the very weak resonance around 3.5 ppm. The $^{13}$C NMR spectrum exhibited three resonances, one center at 140 ppm is attributed to the ipsocarbon of phenyl ring, and an intensive resonance at 128 ppm is caused by the other five carbons of phenyl ring, a very broad resonance center at 50 ppm is caused by the quaternary carbon of poly(phenylcarbyne).

The UV-vis electronic spectrum exhibited an intense broad absorption which started at a wavelength λ≦200 nm and decreased to 460 nm. Corresponding to the electronic absorbance, an intensive, broad fluorescence peak with $\lambda_{max}$ at 460 nm was found in the fluorescence spectrum of the polymer. Both UV-vis and fluorescence properties were consistent with the poly(phenylcarbyne) structure. The elemental analysis of the polymer compared well with the empirical formula (C$_6$H$_5$C)$_n$ of poly(phenylcarbyne).

EXAMPLE 4

Preparation of Poly(phenylcarbyne) Using Highly Reactive Strontium

For Example 4, the same procedure as disclosed in Example 3 was followed. However, instead of using CaI$_2$ and reducing calcium, Sr$_2$ was used and strontium was reduced. This method produced a 42% yield of poly(phenylcarbyne). The spectral data for the resulting compound was also the same as disclosed in Example 3.

EXAMPLE 5

Preparation of Poly(phenylcarbyne) Using Highly Reactive Barium

For Example 5, the same procedure as disclosed in Example 3 was followed. However, BaI2 was used instead of CaI$_2$, and therefore barium instead of calcium was reduced. This method produced a 42% yield of poly(phenylcarbyne). The resulting compound had spectral data analogous to that disclosed in Example 3.

EXAMPLE 6

Preparation of Poly(phenylcarbyne) Using Lithium and Biphenyl

Lithium (0.06 mol) and biphenyl (0.066 mol) in 100 ml flask were stirred in freshly distilled THF (40 ml) at room temperature under argon until the lithium was completely consumed (approx. 2 hours). A solution of α,α,α-trichlorotoluene (0.019 mol) in 10 ml dry THF was the added via cannula at −78° C. The reaction mixture was then warmed to room temperature and refluxed for 4 hours at 67° C. The reaction mixture was then cooled to room temperature and 100 ml of water were added slowly. The organic layer was then separated from the aqueous layer. The organic layer was filtered and concentrated in volume to 25 ml under vacuum. Addition of methanol (100 ml) to the organic layer gave a tan precipitate, which was collected by filtration and purified by reprecipitation with ethanol from a THF solution. This precipitate was then dried under vacuum at 100° C. for 24 hours, giving 1.03 g (61%) of poly(phenylcarbyne).

$^1$H NMR (500 MHz, CDCl$_3$): δ=7.4 ppm (br, C$_6$H$_5$). $^{13}$C NMR (500 MHz, CDCl$_3$): δ=140, 128 (Br, C$_6$H$_5$), and 50 ppm (Br, C$_6$H$_5$C). Infrared (film cast from CHCl$_3$ solution onto NaCl disc): 3053(s), 3022(s), 2920(s), 2930(s), 2850(s), 1948(m), 1884(m), 1805(w), 1600(s), 1493(s), 1180(m), 1157(m), 1030(m), 914(w), 756(s), 667(w), 696 cm$^{-1}$(s). UV-vis (cyclohexane): onset at 460 nm, increased gradually in intensity with decreasing wavelength to 200 nm. Fluorescence (cyclohexane, excitation wavelength=300 nm): λ$_{max}$=460 nm.

EXAMPLE 7

Preparation of Poly(phenyldicarbyne) Using Highly Reactive Barium

Lithium (0.06 mol) and biphenyl (0.066 mol) in a 100 ml flask were stirred in freshly distilled THF (50 ml) at room temperature under argon until the lithium was completely consumed (approx. 2 hours). To a well-suspended solution of BaI$_2$ (0.03 mol) in THF (30 ml) in a 250 ml flask, the preformed lithium biphenylide was transferred via a cannula at room temperature. The solution of highly reactive barium was stirred for one hour at room temperature. A solution of 1,4-bis(trichloromethyl)-benzene (0.01 mol) in 10 ml dry THF was then added at a controlled rate over 30 minutes via cannula at −78° C. The reaction mixture was then warmed to room temperature and refluxed for two hours at 67° C. The reaction mixture was then cooled to room temperature and 100 ml water were added slowly, after which the organic layer was separated from the aqueous layer. The organic layer was filtered, and the precipitate was collected and extracted with methanol and hexane, dried under a vacuum at room temperature for 24 hours and resulted in 1.05 g (100%) poly(phenyldicarbyne), which was a yellow-brown insoluble powder. Infrared (KBr pressed pellet): 3053(s), 3022(s), 2920(s), 2930(s), 2850(s), 1948(m), 1884(m), 1805(w), 1600(s), 1493(s), 1444(s), 1180(m), 1157(m), 1030(m), 914(w), 835(s), 760(w), and 698(w) cm$^{-1}$. The strong Peak for 1,4-disubstituted benzene appeared.

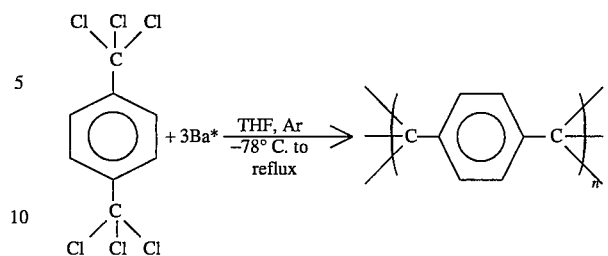

EXAMPLE 8

Preparation of Poly(propylcarbyne) Using 1,1,1,-trichloropropane

Lithium (0.06 mol) and biphenyl (0.066 mol) in a 100 ml flask is stirred in freshly distilled tetrahydrofuran (THF) (40 ml) at room temperature under argon until the lithium is completely consumed (approx. 2 hours). To a well-suspended solution of CaI$_2$ (0.03 mol) in THF (40 ml) in a 250 ml flask, the preformed lithium biphenylide is transferred via cannula at room temperature. The solution of highly reactive calcium is stirred for one hour at room temperature. The highly reactive calcium is dark-green in color and is essentially homogeneous in THF. A solution of 1,1,1-trichloropropane (0.019 mol) in 10 ml dry pentane is then added via a cannula at −78° C. The reaction mixture is then warmed to room temperature and refluxed for four hours at 67° C. The reaction mixture is then cooled to room temperature, and 100 ml of water are added slowly. The organic layer is then separated from the aqueous. The organic layer is filtered and concentrated in volume to 25 ml in vacuum. The product is isolated upon the addition of methanol (100 ml) to the organic layer, collection by filtration and purification by reprecipitation with ethanol from THF solution.

EXAMPLE 9

Preparation of Poly(methyldicarbyne) Using 1,1,1,3,3,3-hexachloropropane

Lithium (0.12 mol) and biphenyl (0.132 mol) in a 100 ml flask is stirred in freshly distilled tetrahydrofuran (THF) (80 ml) at room temperature under argon until the lithium is completely consumed (approx. 2 hours). To a well-suspended solution of CaI$_2$ (0.06 mol) in THF (80 ml) in a 250 ml flask, the preformed lithium biphenylide is transferred via cannula at room temperature. The solution of highly reactive calcium is stirred for one hour at room temperature. The highly reactive calcium is dark-green in color and is essentially homogeneous in THF. A solution of 1,1,1,3,3,3-hexachloropropane (0.019 mol) in 10 ml dry pentane is then added via a cannula at −78° C. The reaction mixture is then warmed to room temperature and refluxed for four hours at 67° C. The reaction mixture is then cooled to room temperature, and 100 ml of water are added slowly. The organic layer is then separated from the aqueous. The organic layer is filtered and concentrated in volume to 25 ml under vacuum. The product is isolated upon the addition of methanol (100 ml) to the organic layer, collection by filtration, purification by reprecipitation with ethanol from THF solution.

EXAMPLE 10

Preparation of a Polycarbyne Using a Monocarbyne-Biscarbyne Co-Monomer

Lithium (0.06 mol) and biphenyl (0.066 mol) in a 100 ml flask were stirred in freshly distilled THF (40 ml) at room temperature under argon until the lithium was completely consumed (approx. two hours). To a solution of α,α,α-trichlorotoluene (0.016 mol) and 1,4-bis(trichloromethyl)-benzene (0.0016 mol) in 20 ml dry THF in a 250 ml flask, the preformed lithium biphenylide was transferred at a controlled rate over 30 minutes via cannula at −78° C. The reaction mixture was then warmed to room temperature and refluxed for 10 hours at 67° C. The reaction mixture was then cooled to room temperature and 100 ml of water were added slowly. The organic layer was then separated from the aqueous layer. The organic layer was filtered and concentrated in volume to 40 ml under a vacuum. When methanol (100 ml) was added to the organic layer, a brown precipitate formed. The precipitate was collected by filtration and purified by reprecipitation with ethanol from THF solution. The precipitate was then dried under a vacuum at 100° C. for 24 hours giving 1.20 g (76%) of a poly(phenylcarbyne) tan powder.

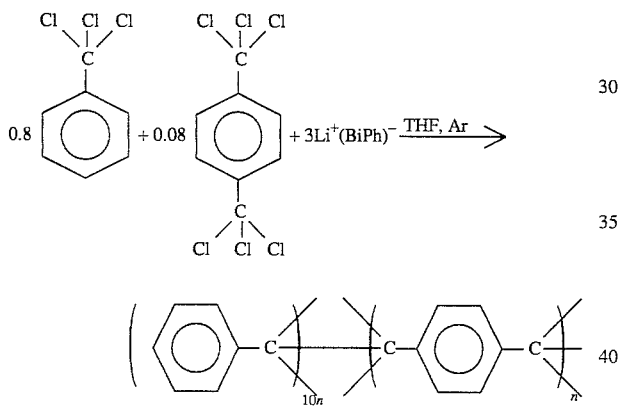

What is claimed is:

1. A method for preparation of a doped polycarbyne comprising: contacting a source of electrons which is soluble in an ethereal, polyethereal or hydrocarbon solvent and has a reduction potential of −0.2 or more negative relative to the standard calomel electrode with a carbyne containing organic monomer or co-monomer in an ethereal, polyethereal or hydrocarbon solvent to form a doped polycarbyne; wherein said organic monomer contains at least one carbyne group and at least one atom selected from the group consisting of nitrogen, boron, arsenic, antimony, bismuth, sulfur, selenium, and phosphorus electrons is soluble in an ethereal, polyethereal, or hydrocarbon.

2. The method of claim 1 wherein the source of electrons is at least 0.5 wt-% soluble.

3. The method of claim 1 wherein the organic monomer or co-monomer contains one carbyne group.

4. The method of claim 3 wherein the organic monomer or co-monomer is an arylcarbyne.

5. The method of claim 3 wherein the organic monomer or co-monomer is an alkylcarbyne.

6. The method of claim 1 wherein the organic monomer or co-monomer contains two carbyne groups.

7. The method of claim 1 wherein the organic monomer or co-monomer is an arylalkylcarbyne co-monomer.

8. The method of claim 1 wherein the co-monomer comprises a monocarbyne moiety and a biscarbyne moiety.

9. The method of claim 1 wherein the co-monomer contains an alkylcarbyne and an arylcarbyne compound.

10. The method of claim 1 wherein the source of electrons is a complex of an alkali metal and an electron transfer compound.

11. The method of claim 10 wherein the source of electrons is an alkali metal complex of naphthalene, biphenyl, or anthracene.

12. The method of claim 1 wherein the source of electrons is a highly reactive non-alkali metal species.

13. The method of claim 12 wherein the source of electrons is a highly reactive barium, strontium, copper or calcium species.

14. A method for preparation of a polycarbyne comprising:

(a) contacting in an ethereal, polyethereal, or hydrocarbon solvent a metal salt, soluble in an ethereal, polyethereal or hydrocarbon solvent, with a reducing agent having a reduction potential of −1.5 volts or more negative relative to the standard calomel electrode solubilized in an ethereal, polyethereal, or hydrocarbon solvent, to form a soluble highly reactive metal species;

(b) contacting the soluble highly reactive metal species with an organic monomer or co-monomer in an ethereal, polyethereal or hydrocarbon solvent to form a doped polycarbyne; wherein said organic monomer or co-monomer contains at least one carbyne group and at least one atom selected from the group consisting of nitrogen, boron, arsenic, antimony, bismuth, sulfur, selenium and phosphorus; and wherein said highly reactive metal species is soluble in an ethereal, polyethereal, or hydrocarbon solvent.

15. The method of claim 14 wherein the metal salt a Ca(II) salt, Ba(II) salt, CU(I) salt, Cu(II) salt, or Sr(II) salt.

16. The method of claim 14 wherein the solubilized reducing agent is an alkali metal complex of naphthalene, biphenyl, or anthracene.

17. A method for preparation of doped polymer fibers comprising:

(a) contacting a soluble source of electrons with an organic monomer in an ethereal, polyethereal or hydrocarbon solvent to form a doped polycarbyne; wherein the organic monomer or co-monomer contains at least one atom selected from the group consisting of nitrogen, boron, arsenic, antimony, bismuth, sulfur, selenium and phosphorus and at least one carbyne group; and wherein said soluble source of electrons is soluble in an ethereal, polyethereal, or hydrocarbon solvent; and (b) forming fibers from the doped polycarbyne.

18. The method of claim 17 wherein the organic monomer or co-monomer contains at least one carbyne group bonded to a phenyl group.

19. A doped polycarbyne of the following formula:

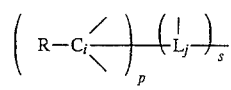

wherein:

(a) said polycarbyne comprises a tetrahedral three dimensional network;

(b) i=at least one and represents the number of carbyne groups in a monomer or co-monomer unit;

(c) R=a ($C_{1-100}$) alkyl group, a ($C_{6-100}$) aryl group or a ($C_{7-100}$) arylalkyl group;

(d) p=at least two and represents the number of monomer or co-monomer units in the polycarbyne;

(e) j=at least one and represents the number of different types of inorganic doping atoms in a monomer or co-monomer unit;

(f) L=nitrogen, boron, arsenic, antimony, bismuth, sulfur, selenium or phosphorus;

(g) s=at least one and represents the number of doping agent units in a monomer or co-monomer unit; and (h) each R, each i, each j, each L and each I can be the same or different.

20. The doped polycarbyne of claim 19 wherein i=1 for every monomer unit.

21. A doped polydicarbyne of the following formula:

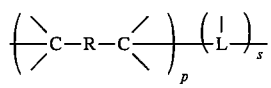

wherein:

(a) said doped polycarbyne comprises a tetrahedral three dimensional network;

(b) R=a ($C_{1-100}$) alkyl group, a ($C_{6-100}$) aryl group or a ($C_{7-100}$) arylalkyl group;

(c) p=at least two and represents the number of monomer units in the doped polycarbyne;

(d) L=nitrogen, boron, arsenic antimony, bismuth, sulfur, selenium or phosphorus;

(e) s=at least one and represents the number of doping agent units in a monomer or co-monomer unit; and (d) each R and each I can be the same or different.

22. A doped polycarbyne of the following formula:

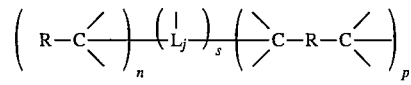

wherein:

(a) said doped polycarbyne comprises a tetrahedral three dimensional network;

(b) R=a ($C_{1-100}$) alkyl group or a ($C_{6-100}$) aryl group or a ($C_{7-100}$) arylalkyl group;

(c) p=is at least one;

(d) n=is at least one;

(e) s=is at least one;

(f) L=nitrogen, boron, arsenic, antimony, bismuth, sulfur, selenium or phosphorus; and (g) each R and each I can be the same or different.

23. A doped polymer fiber prepared from a tetrahedral three dimensional polycarbyne having a formula:

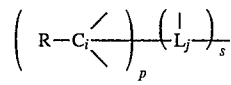

wherein:

(a) i=at least one and represents the number of carbyne groups in a monomer or co-monomer unit;

(b) R=a ($C_{1-100}$) alkyl group or a ($C_{6-100}$) aryl group or a ($C_{7-100}$) arylalkyl group;

(c) p=is at least two and represents the number of monomer or co-monomer units in the polycarbyne;

(d) L=nitrogen, boron, arsenic, antimony, bismuth, sulfur, selenium or phosphorus;

(e) s=at least one and represents the number of doping agent units in a monomer or co-monomer unit;

(f) j=at least one and represents the number of different types of inorganic doping atoms in a monomer or co-monomer unit;

(g) an each R, each I, each L, each j and each i can be the same or different.

* * * * *

UNITED STATES PATENT AND TRADEMARK OFFICE
CERTIFICATE OF CORRECTION

PATENT NO. : 5,463,018

DATED : October 31, 1995

INVENTOR(S) : Reuben D. Rieke

It is certified that error appears in the above-identified patent and that said Letters Patent is hereby corrected as shown below:

On column 1, line 21, please delete "flints" and substitute therefore --films--

On column 4, line 27, please delete "monomers" after the word "co-monomers"

On column 5, line 29, please delete "crystals" and substitute therefore --cryptates--

On column 5, line 46, please delete "solvate" and substitute therefore --solvates--

On column 7, line 9, please delete "tile" and substitute therefore --the--

On column 15, line 10, please delete "from" and substitute therefore --form--

On column 16, lines 36 and 37, please delete " 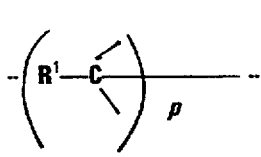 " and substitute therefore $$-\left(R^1-C\right)_p-$$

On column 17, line 30, please delete "p" and substitute therefore --n--

On column 18, line 58, please delete "Their" and substitute therefore --There--

On column 19, line 9, please delete "Them" and substitute therefore --There--

On column 20, line 14, please delete "Li$^+$Biph$^-$" and substitute therefore --Li$^+$BiPh$^-$--

On column 20, line 55, please delete "tour" and substitute therefore --four--

On column 20, line 61, please delete "CDCL3" and substitute therefore --CDCL$_3$--

UNITED STATES PATENT AND TRADEMARK OFFICE
CERTIFICATE OF CORRECTION

PATENT NO. : 5,463,018

DATED : October 31, 1995

INVENTOR(S) : Reuben D. Rieke

It is certified that error appears in the above-identified patent and that said Letters Patent is hereby corrected as shown below:

On column 21, line 13, please delete "preparation" and substitute therefore --Preparation--

On column 22, line 63, please delete "Bal2" and substitute therefore --$Bal_2$--

On column 25, lines 55 and 56, please delete "electrons is soluble in an ethereal, polyethereal, or hydrocarbon" after the word "phosphorus"

On column 26, line 36 (claim 15), please insert --is-- after the word "salt"

On column 28, line 4 (claim 22), please delete "  " and substitute therefore $$-\left(-L-\right)_s-$$

Signed and Sealed this

Twenty-sixth Day of March, 1996

Attest:

BRUCE LEHMAN

Attesting Officer   Commissioner of Patents and Trademarks